United States Patent [19]

Rogers et al.

[11] Patent Number: 4,959,809
[45] Date of Patent: * Sep. 25, 1990

[54] MULTIPLE SENSOR POSITION LOCATING SYSTEM

[75] Inventors: W. Leslie Rogers; Neal H. Clinthorne, both of Ann Arbor, Mich.

[73] Assignee: The University of Michigan, Ann Arbor, Mich.

[*] Notice: The portion of the term of this patent subsequent to Jul. 25, 2006 has been disclaimed.

[21] Appl. No.: 322,095

[22] Filed: Dec. 28, 1988

Related U.S. Application Data

[63] Continuation-in-part of Ser. No. 876,762, Jun. 20, 1986, Pat. No. 4,852,056, and a continuation-in-part of Ser. No. 196,928, May 20, 1988.

[51] Int. Cl.⁵ .................. G06F 15/20; G01T 1/20
[52] U.S. Cl. ................................ 364/581; 364/527; 364/571.01; 250/369; 250/363.01
[58] Field of Search .............. 364/581, 527, 571.01, 364/516, 414, 518; 250/363 R, 363 S, 369, 366, 363, 363 SE; 341/13

[56] References Cited

U.S. PATENT DOCUMENTS

4,117,538  9/1978  Shrader et al. ............... 364/517
4,809,194  2/1989  Crookshanks ................. 364/581

Primary Examiner—Parshotam S. Lall
Assistant Examiner—Ellis B. Ramirez
Attorney, Agent, or Firm—Rohm & Monsanto

[57] ABSTRACT

A system for locating the position of a source of a detectable emittance is particularly adapted for locating the position of a scintillation event in a scintillation crystal which has arranged adjacent thereto a plurality of photomultiplier tubes arranged in a predetermined configuration for detecting the scintillation event. In a single photon emission computer tomography (SPECT) embodiment, a system which utilizes the present invention is initialized by storing weighting factors which are derived from placing a source of radiation in a plurality of known locations. The output values of the photomultiplier tubes are stored in a calibration file and subjected to a mathematical process to produce the weighting factors which are subsequently stored in a memory. During operation of the system, the signal values from the photomultiplier tubes are combined with the weighting factors to produce weighted signals which are then summed together to produce a composite weighted signal. The addresses of the weighting factors are correlated to position information; the correct position information being determined in response to the composite weighted signal assuming a predetermined value.

11 Claims, 4 Drawing Sheets

FIG. 3
PHOTOMULTIPLIER RESPONSE FUNCTIONS (X)

FIG. 4
X WEIGHTS

FIG. 5

MULTIPLE SENSOR POSITION LOCATING SYSTEM

RELATIONSHIP TO OTHER PATENT APPLICATIONS

This patent application is a continuation-in-part of copending U.S. patent application Ser. No. 876,762, filed June 20, 1986 (now U.S. Pat. No. 4,852,056), and of co-pending U.S. patent application Ser. No. 196,928, filed May 20, 1988, both of said co-pending patent applications being by the same inventors as herein and assigned to the same assignee.

BACKGROUND OF THE INVENTION

This invention relates generally to systems for locating a position of a source of a detectable emittance, and more particularly, to a system which is particularly adapted for locating the position of a scintillation event in single photon emission computer tomography (SPECT).

The estimation of a position of an event or other interaction which affects a plurality of sensors has received considerable attention in a variety of disciplines. Of particular interest is the estimation of the position of a scintillation event in a radiation detector, particularly of the type used in single photon emission computer tomography. Most commonly, SPECT systems utilize detectors which are comprised of arrays of small detector elements, such as photomultiplier tubes. In order to maximize the useful field of view, the photomultiplier tubes are arranged in a predetermined configuration, which may be an array having a rectilinear or hexagonal configuration. The essential purpose of such a system, particularly a SPECT configuration as used in nuclear medicine, is to facilitate the imaging of radionuclides distributions in a predetermined region.

The essential element of a known scintillation camera of the modular type employs a scintillation crystal which is arranged to communicate with a light guide. The light guide is in turn connected to a plurality of photomultiplier tubes which produce respective electrical signals responsive to the number of optical photons which reach each photomultiplier tube as a result of a scintillation event. As is known, the number of optical photons which impinge on a photomultiplier tube result in the production of a multiplicity of photoelectrons in each photomultiplier tube. It is significant to note, however, that almost all of the events incident to scintillation events and their detection must be analyzed statistically. For example, both, the number of photons generated in each scintillation event, as well as the number of photoelectrons produced in each photomultiplier tube, are statistical. These numbers, therefore, fluctuate about a mean value which, with respect to the number of photoelectrons produced in each photomultiplier tube, is a function of the position of the scintillation event. The uncertainties attendant any given event result in difficulties in ascertaining the precise position of the event.

The prior art has thrust at the problem of position estimation from a variety of approaches. One known method utilizes a completely digital system which employs look-up tables stored in memories. It is a problem with the known system that it requires a very large memory for more than two or three sample inputs. Also, the method depends upon the spatial resolution of the position estimation. In situations where four phototubes are employed, this known system could easily require sixteen megabytes of memory to estimate only sixty-four discrete positions.

A further known system utilizes both analog and digital aspects, and employs resistor networks and summing amplifiers. It is a problem with this method that it is inflexible and quite expensive. Again, using four phototubes for example, this known system would require sixty-four amplifiers and 256 precision resistors to achieve the same estimation. The resistors may need to be nonstandard values, thereby increasing the cost. Moreover, such components occupy considerable space and must be mounted individually on circuit boards.

It is, therefore, an object of this invention to provide a simple and inexpensive system for estimating the position of a source of an emittance, or an event, such as a scintillation event.

It is another object of this invention to provide a precision estimating system which can be rapidly and easily configured to suit given detector module characteristics, without requiring changing resistors or other circuit board components.

It is a further object of this invention to provide a position estimator wherein no penalty is incurred as a result of dividing more finely the interpolated position values.

It is also an object of this invention to provide a position estimating system which is easily extended to include a greater number of phototubes.

It is additionally an object of this invention to provide a position estimating system which can be extended to perform multidimensional maximum likelihood estimates.

It is still another object of this invention to provide a precision estimating system which can be speeded up simply and with very little increase in cost.

A still a further object of this invention is to provide a position estimating system which can use relatively slow and inexpensive components.

SUMMARY OF THE INVENTION

The foregoing and other objects are achieved by this invention which provides a system for locating a position of a source of a detectable emittance, such as a scintillation event, utilizing a plurality of sensors arranged in a predetermined configuration with respect to one another. Each such sensor detects the detectable emittance and produces at an associated output a respective sensor signal which has a value which corresponds substantially to the magnitude of the detectable emittance which impinges on the associated sensor. A plurality of weighting values, which are determined during an initialization, or calibration cycle, are stored in a memory and are combined with the signals from the sensors to produce weighted sensor signals. The weighted sensor signals are combined in a summing arrangement which produces at its output a composite signal. The value of the composite signal is monitored while the weighting factors are recalled from the memory. The addresses of the weighting factors in the memory are correlated to position information, illustratively by way of a position look-up table, the correct position value being selected in response to the composite signal assuming a predetermined value. In a preferred embodiment, the predetermined value corresponds to zero.

It is a highly significant aspect of the invention that it provides a system for weighting directly the analog outputs of the sensors with the use of programmable, easily verified weighting functions. The weighting functions depend upon the distance between the scintillation event and the sensor, and are combined with the analog outputs of the sensors to determine a digital position in accordance with any algorithm which is linear with the outputs of the sensors.

In one embodiment of the invention, the weighted sensor signals are produced by combining each sensor signal with a respectively associated weighting factor in a digital-to-analog converter (DAC). The output of the various DACs are combined in a summing arrangement which produces at its output the composite weighted signal. Increases in speed of operation of the system can be achieved by using additional DACs in parallel.

In one advantageous embodiment of the invention, processing efficiency is improved by identifying the one of the sensors, which may be photomultiplier tubes, which is issuing the highest magnitude signal. Such identification establishes a neighborhood in which a search for the position of the event or interaction is conducted. The neighborhood is identified by a range of addresses of the weight factor memory. Thus, as the weight factors are clocked out of the memory, illustratively in response to a clock, the composite weighted signal is monitored, illustratively by means of a zero-crossing detector. The maximum likelihood position of the event or interaction corresponds to the location at which the composite weighted signal assumes a zero value. Of course, persons skilled in the art can configure the circuitry which will be disclosed in detail hereinbelow so that the maximum likelihood position corresponds to some other value of the composite weighted signal. In the present embodiment of the invention, the use of a zero-crossing detector is enabled by using DACs having complementary current outputs. In such an embodiment, the complementary current outputs are coupled to inverting and noninverting inputs of an amplifier, the output of which is a true representation of the product of the weight factors in the sensor signal values.

Since it is expected that, in tomographic embodiments, a scintillation event may occur during processing of a prior event, a plurality of sample and hold arrangements are provided for each photomultiplier tube. Thus, while one sample and hold arrangement is holding the sensor signal value for processing, the other sample and hold arrangement is open to receive a signal value corresponding to a subsequent scintillation event. A multiplexer is provided to enable selection between the sample and hold arrangements.

BRIEF DESCRIPTION OF THE DRAWING

Comprehension of the invention is facilitated by reading the following detailed description, in conjunction with the annexed drawing, in which.

DETAILED DESCRIPTION

A detector intended for SPECT application is required to meet several requirements. These include high photo peak sensitivity for $123_I$ and $111_{In}$. In addition, the detector must have greater than 90% packing fraction in ring geometry, an intrinsic resolution of 3 mm or better over the full module width, and continuous sampling in the axial (y) direction.

Figure 1:
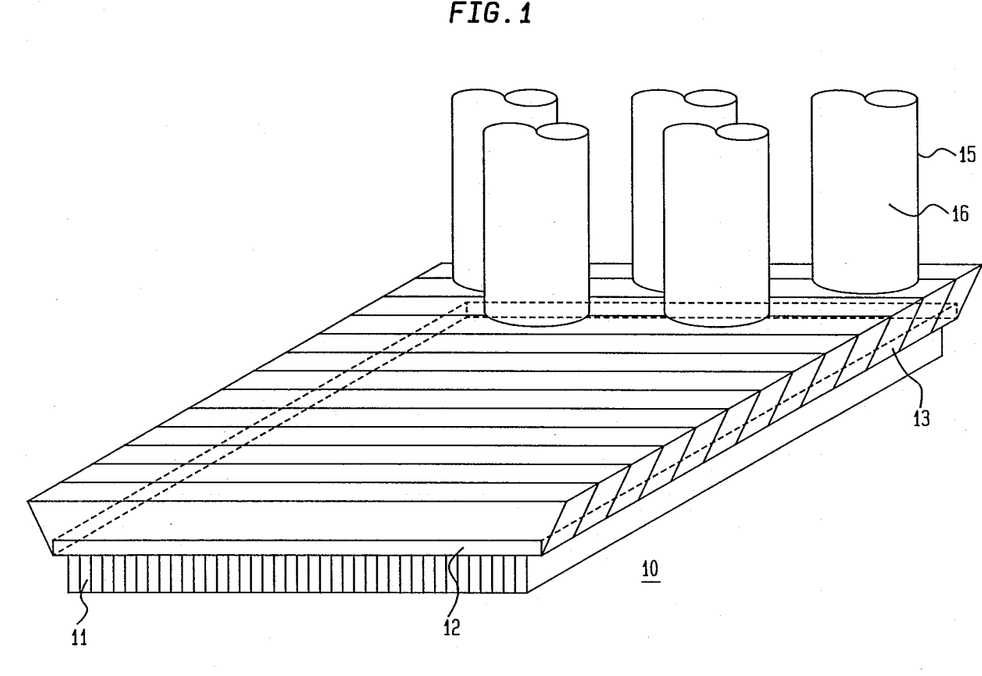
FIG. 1 is an isometric representation of a detector arrangement for use in SPECT wherein scintillation bars are optically coupled to photomultiplier tubes via a segmented light guide.

FIG. 1 is an isometric representation of a detector arrangement 10 which meets the foregoing conflicting requirements. As shown, detector arrangement 10 is provided with a plurality of sodium iodide bars 11 which may be 3 mm wide by 12.5 mm thick, and 15 cm long. The sodium iodide (NaI) bars are optically coupled to a Pyrex face plate 12 which, in this specific illustrative embodiment, has a thickness of 5 mm. Pyrex face plate 12 is optically coupled to a segmented light guide 13 which is designed to match the x and y light-spread function to the diameters of a plurality of photomultiplier tubes 15. Segments light guide 13 is dimensioned to space the photomultiplier tubes radially so that the scintillator edge does not extend much beyond the centers of those photomultiplier tubes arranged on the edge, such as photomultiplier tube 16.

NaI bars 11, which are thin scintillation bars, provide continuous sampling in the y direction and limit the light-spread function to 12.5 mm full width half maximum (FWHM) in the x direction. The light distribution is only minimally distorted at the module edge so that resolution and linearity can be maintained over essentially the full module width. The shape of the light-spread function from thin bars, such as those of the present detector, is much less dependent on interaction depth than is the case for continuous crystals. Thus, the detector response will be less sensitive to gamma ray energy.

Figure 2:
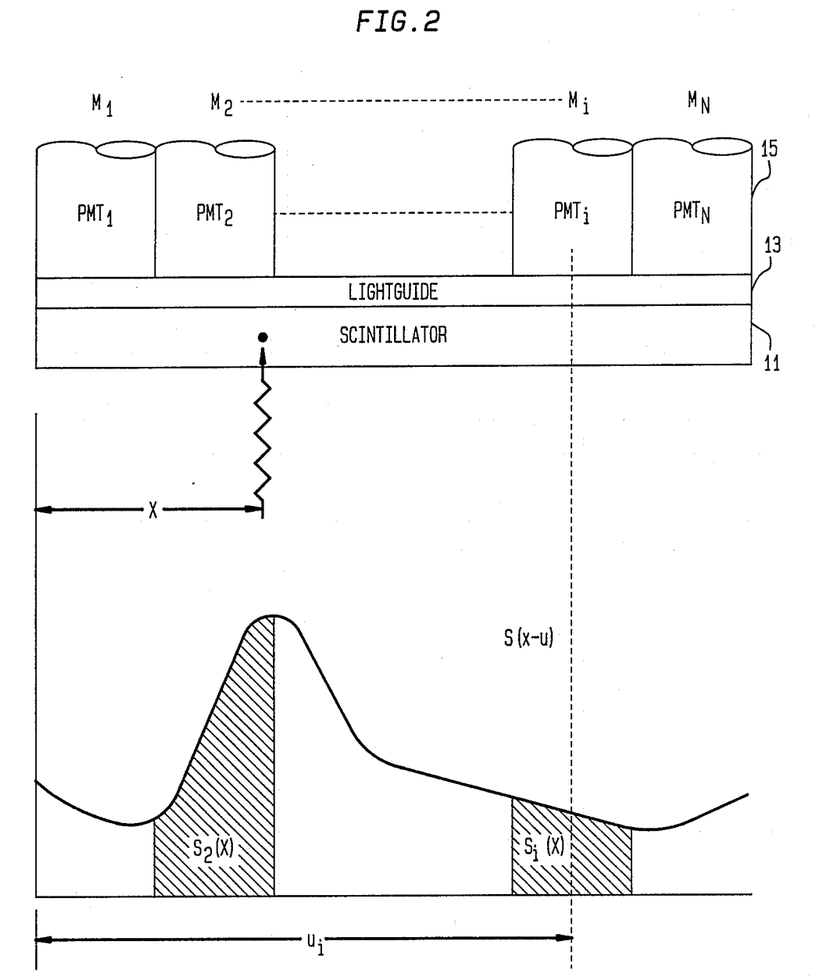
FIG. 2 is a schematic representation of a one-dimensional geometry which is useful for explaining the position estimation problem.

FIG. 2 is a schematic representation which illustrates the one-dimensional geometry for the position estimation problem. Elements of structure having analogous correspondence to those of FIG. 1 are similarly designated. In FIG. 2, if the expected value of scintillation light intensity at the surface of the light guide for an interaction occurring at x is given by S(x-u), the mean output of the ith phototube of radius r as a function of 20, source position may be written as:

$$S_i(x) = \int_{u_i - r}^{u_i + r} S(x - u) du \qquad (1)$$

where $u_i$ locates the center of photomultiplier tube $PMT_i$. In accordance with a method described in an article entitled "One Dimensional Scintillation Cameras for Positron ECT Ring Detectors", by Burnham, et al., IEEE Transactions on Nuclear Science, Vol. NS-28, No. 1, February, 1981, which article is incorporated herein by reference, let $M_I$ represent a noisy measurement of $S_i$. For a single event, assuming that the number of photons reaching the tube is governed by Poisson statistics, the conditional probability of observing $M_i$ given x is:

$$PROB[M_i|x] = \frac{S_i(x)^{M_i} e^{S_i(x)}}{M_i!}. \quad (2)$$

If the $M_i$ are independent, the joint probability of observing a set of $M_i$, M. for the N phototubes is:

$$PROB[M|x] = \prod_{i=1}^{N} \frac{S_i(x)^{M_i} e^{S_i(x)}}{M_i!}. \quad (3)$$

If $\hat{x}$ is the value of x that maximizes PROB[M|x], it will also maximize the ln(PROB[M|x]) so that we can write:

$$\frac{\partial}{\partial x} \ln(PROB[M|x]) = 0 \quad (4)$$

$$= \sum_{i=1}^{N} M_i \frac{\partial S_i(x)/\partial x}{S_i(x)} - \frac{\partial}{\partial x} \sum_{i=1}^{N} S_i(x) \quad (5)$$

$$\approx \sum_{i=1}^{N} M_i \left\{ \frac{\partial S_i(x)/\partial x}{S_i(x)} - \frac{\partial/\partial x \left( \sum_{i=1}^{N} S_i(x) \right)}{S_i(x)} \right\} \quad (6)$$

$$= \sum_{i=1}^{N} M_i W_i(x) \quad (7)$$

The second term of the explicit weighting function shown in Equation (6) is a bias related to the spatial derivative of total light collected. It compensates for changes in light collection at edges and between tubes. The weighting functions are also seen to be energy normalized which means that if the light distribution is constant, the position estimator is energy dependent.

Equation (7) describes a continuous sequence of inner products of the phototube outputs with the spatially-variant weighting functions $W_i(x)$ which have been calculated form the mean tube responses. That value of x for which the product equals zero corresponds to $\hat{x}$, the most likely value of x. In the actual case, the spatial coordinate is sampled discretely, and the sets of weights are represented as $W_j$.

In essence, the present invention provides a system for weighting directly the analog outputs of the sensors with the use of programmable, easily verified weighting functions, and is not limited in its operation to determining the most likely value of x. Such weighting functions, which are a function of the distance between the scintillation event and the sensor, are combined with the analog outputs of the sensors to determine a digital position in accordance with any algorithm which is linear with the outputs of the sensors. Thus, since it is evident that Equation (7) is a linear function of the sensor outputs $M_i$, the weights can be given as:

$$W_i(x) = X - X_i$$

This position corresponds to the centroid of the sensor outputs, rather than the most likely estimate.

If the two-dimensional sampled light-spread function, $S_{ij}(x,y)$, were separable and spatially invariant so that it could be written as $S_i(x)S_j(y)$, then the two-dimensional problem could legitimately be reduced to two independent one-dimensional problems involving row and column sums of the phototube outputs and separate x and y weighting functions. This assumption is clearly violated in the case of an hexagonally packed array of round photomultiplier tubes. The correct solution is to perform a full two-dimensional likelihood calculation as described in an article entitled "Digital Position Estimation for the Modular Scintillation Camera", by Milster, et al., IEEE Transactions on Nuclear Science, Vol. NS-32, pp. 748–752, 1985. This can be accomplished, but at the expense of greatly increased memory and/or computation time. The two-dimensional geometry was therefore simulated to determine how much distortion would result from approximating the two-dimensional solution by two one-dimensional solutions. Based on simulations and measurements on thin NaI bars, a light-spread function of the form:

$$S(x,y) = \frac{1}{1 + \alpha x^2} \frac{1}{1 + \beta y^2}$$

was used with the FWHM in x and y equal to 38 and 55 mm, respectively.

Figure 3:
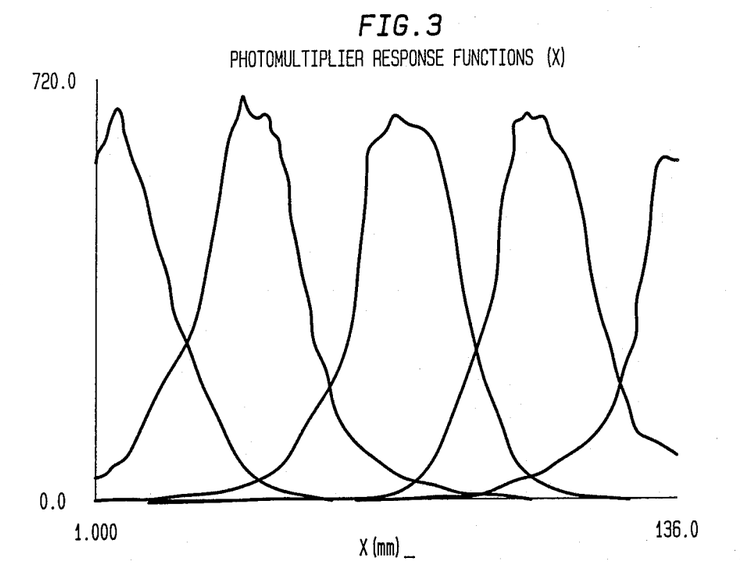
FIG. 3 is a graphical representation of photomultiplier tube response functions plotted with respect to distance x in mm.
Figure 4:
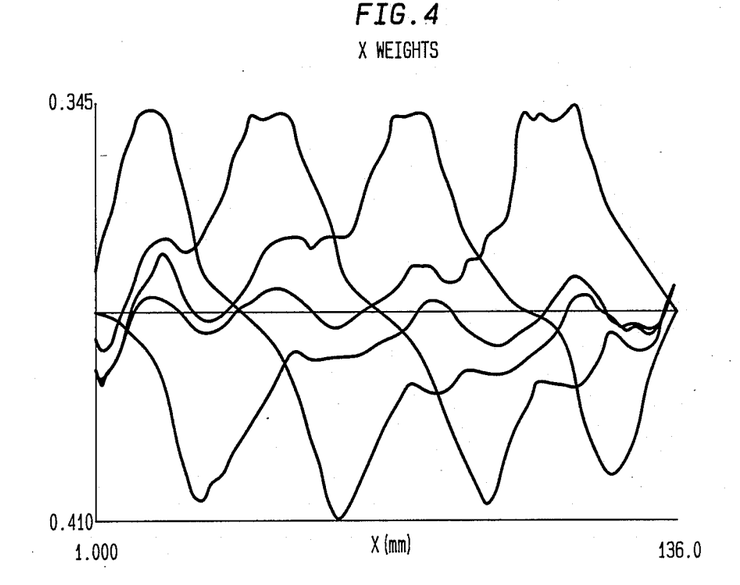
FIG. 4 is a graphical representation of weight factors plotted with respect to distance x in mm.

FIG. 3 is a graphical representation of a plurality of measured photomultiplier tube response functions plotted with respect to distance x. As shown, the x-coordinate is calibrated in millimeters. FIG. 4 is a graphical representation of a plurality of weight factors plotted with respect to distance x. The weight factors in the embodiment of the invention assume both negative and positive values. As will be described hereinbelow, the responses of the photomultiplier tubes will be combined with the respectively associated weight factors to produce a weighted photomultiplier tube response signal for each photomultiplier tube. The weighted photomultiplier tube response signals are then summed to produce a composite weighted photomultiplier tube response signal. When this composite signal assumes a predetermined value, which is zero in the specific illustrative embodiment of the invention described herein, the corresponding value of x is the position of maximum likelihood for the event.

Figure 5:
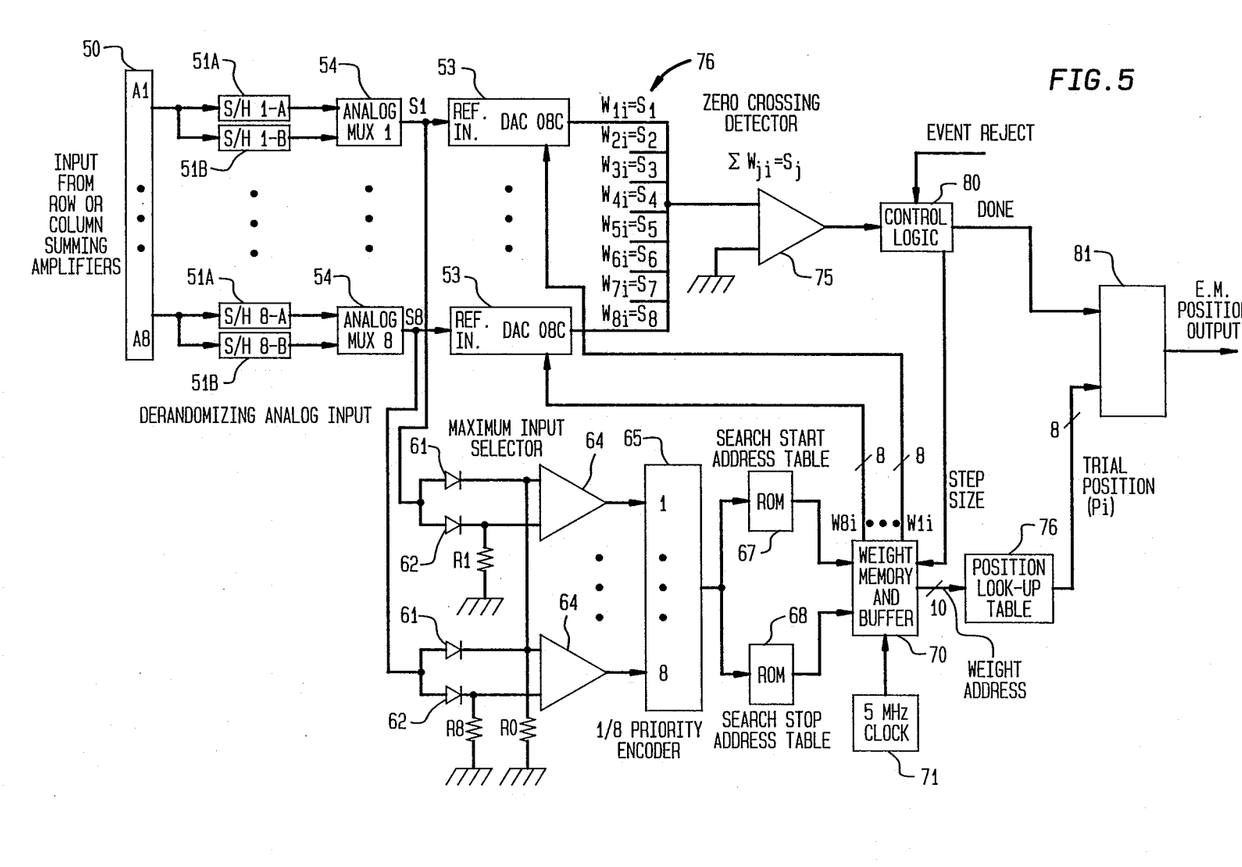
FIG. 5 is a function block and line representation of a specific illustrative embodiment of the invention.

FIG. 5 is a function block and line representation of a specific illustrative embodiment of the invention. The circuit of FIG. 5 is used to compute the x or the y coordinates of each event. Thus, two such circuits are utilized to produce the coordinate pair in a two-dimensional embodiment.

In this embodiment, a plurality of input terminals 50 receive pulses from each row or column summing amplifier (not shown) which are coupled to the photomultiplier tubes (not shown in this Figure). The pulses from each row or column are fed to two respectively associated sample and hold amplifiers 51A and 51B. In practice, the sample and hold amplifiers may be of a type known as Harris 5320. Pulses which satisfy a minimum energy criterion are stretched, by the holding operation of the sample and hold amplifiers, and presented at a reference input of a multiplying digital-to-analog converter (DAC) 53. The selection of whether the output of sample and hold amplifier 51A or sample and hold amplifier 51B is conducted to DAC 54 is performed by an analog multiplexer 54. In this specific embodiment, DAC 53 is a Signetics 4-quadrant 8-bit high-speed multiplying type. Thus, a single stage of analog buffering is used to derandomize the input pulses.

The stretched pulses from each input channel are also conducted to a respectively associated pair of diodes 61 and 62 which are coupled at their cathodes to respective inputs of a respective comparator 64. The maximum of the eight input voltages, minus the drop across the respective one of diodes 61 and 62, appears across resistor R0, and therefore at one input of all eight comparators 64 in this embodiment. Only for a channel with the maximum input voltage will both diodes 61 and 62 be conducting, and since the value of R0, is smaller than the values of resistors R1-R8, the voltage drop across the associated diode 61 of the pair will exceed the voltage drop across the associated diode 62. Thus, the corresponding comparator 64 will change states.

Comparators 64 are each connected at respective inputs of a priority encoder 65 which issues at its output a signal which identifies the particular one of comparators 64 which changed its state. In this manner, the search for the maximum likelihood position can be confined to the neighborhood of the maximum row or column by identifying the particular one of comparators 64 which is associated with the channel having the maximum input signal.

The output signal of priority encoder 65 causes a search start address to be selected from ROM 67 and a search stop address to be selected from ROM 68. These addresses are conducted to a weight memory 70 which contains within its memory locations for each of the eight channels in this embodiment. Once the start and stop addresses have been determined from ROMs 67 and 68, the weights are synchronously clocked out in parallel to their respectively associated ones of DACs 53 in response to a clock 71. In this specific embodiment, DACs 53 provide complementary current outputs which permit negative weights, as shown in FIG. 4 hereinabove, to be used. The output currents of DACs 53 are each proportional to the product of the weight being clocked into them and the summed output of a row or column of phototubes (not shown). The sum of these products, which is equal to the local value of the superposition integral (Equation (7)), is conducted to zero-crossing detector 75.

In accordance with this specific embodiment, the sensor signals at the inputs of DACs 53 are transformed to respective weighted sensor signals at the outputs thereof. These weighted signals are then summed algebraically in summing network 76 which delivers to zero-crossing detector 75 a summed, or composite, weighted sensor signal.

In order to save processing time, the initial search is conducted in a coarse step mode. When zero crossing is detected at zero-crossing detector 75, a signal is conducted to control logic system 80 which controls the step size of the increments in weight memory 70. Consequently, the step size is reduced, and the scan direction is reversed to obtain a more precise location of the zero crossing. Scintillation events which do not satisfy a minimum energy criteria can be rejected at any time by control logic 80. In addition, control logic 80 controls analog multiplexors 54, controlling the system output at output register 81, and other system functions.

Although the invention has been described in terms of specific embodiments and applications, persons skilled in the art can, in light of this teaching, generate additional embodiments without exceeding the scope or departing from the spirit of the claimed invention. Accordingly, it is to be understood that the drawing and description in this disclosure are proffered to facilitate comprehension of the invention, and should not be construed to limit the scope thereof.

What is claimed is:

1. A system for locating a position of a source of a detectable emittance, the system comprising:
    a plurality of sensors arranged in a predetermined configuration with respect to one another, each for detecting the detectable emittance and producing at an associated output thereof a respective sensor signal having a sensor signal value which is substantially responsive to the detectable emittance impinging on said associated sensor;
    memory means for storing a plurality of weighting values, each associated with a respective one of said sensors, said weighting values being responsive to a sensor response characteristic of said associated one of said sensors and corresponding to a predetermined distance value;
    means for searching said memory means and selecting at least one of said weighting values, within a predetermined range of memory addresses;
    arithmetic combiner means having a first input for receiving at least one of said sensor signals, and a second input for receiving a weighting value from said memory means, for producing at an output thereof a composite weighted signal having a composite weighted signal value responsive to said sensor signal value and said weighting value; and
    position encoder means for producing a position value responsive to a composite weighted signal value, said position value corresponding to the a maximum likelihood position estimate of the detectable emittance.

2. The system of claim 1 wherein there are further provided:
    maximum input selector means for determining which of said sensors provided at its output a sensor signal having a largest sensor signal value;
    first ROM means for providing a search start address of said memory means; and
    second ROM means for providing a search stop address of said memory means, said first and second ROM means being responsive to said maximum input selector means.

3. The system of claim 2 wherein said maximum input selector means comprises:
    summing means for producing a sum signal corresponding to a summation of said sensor signals in each of a plurality of axes of said predetermined configuration of said sensor means; and
    comparator means for selecting one of said axes as corresponding to a portion of a coordinate pair identifying the location of said one of said sensors having at its output said sensor signal having said largest sensor signal value.

4. A system for locating a position of a source of a detectable emittance, the system comprising:
    a plurality of sensors arranged in a predetermined configuration with respect to one another, each for detecting the detectable emittance and producing at an associated output thereof a respective sensor signal having a sensor signal value which is substantially responsive to the detectable emittance impinging on said associated sensor;
    memory means for storing a plurality of weighting values, each associated with a respective one of said sensors, said weighting values being responsive to a sensor response characteristic of said associated one of said sensors and corresponding to a predetermined distance value, said weighted signal values being correlated to distance in accordance with the relationship $W_i(x)=X-X_i$;

arithmetic combiner means having a first input for receiving at least one of said sensor signals, and a second input for receiving a weighting value from said memory means, for producing at an output thereof a composite weighted signal having a composite weighted signal value responsive to said sensor signal value and said weighting value; and position encoder means for producing a position value responsive to said composite weighted signal value.

5. The system of claim 4 wherein said arithmetic combiner means comprises a digital-to-analog converter.

6. The system of claim 4 wherein there are further provided:

maximum input selector means for determining which of said sensors provided at its output a sensor signal having a largest sensor signal value;

first ROM means for providing a search start address of said memory means; and second ROM means for providing a search stop address of said memory means, said first and second ROM means being responsive to said maximum input selector means.

7. The system of claim 6 wherein said maximum input selector means comprises:

summing means for producing a sum signal corresponding to a summation of said sensor signals in each of a plurality of axes of said predetermined configuration of said sensor means; and comparator means for selecting one of said axes as corresponding to a portion of a coordinate pair identifying the location of said one of said sensors having at its output said sensor signal having said largest sensor signal value.

8. An arrangement for locating a position of a scintillation event in a predetermined region, the arrangement comprising:

a plurality of photomultiplier elements (PME) arranged in an array configuration with respect to one another, each for detecting the scintillation event and producing a PME signal having a PME signal value which is related to a distance between said PME and the scintillation event;

weighting means for applying a respectively associated plurality of weighting values to at least selected ones of said PME signal values to produce a corresponding plurality of weighted PME signal values, said weighting values being responsive to a response characteristic of said respectively associated selected ones of said PMEs, said weighted signal values being 4 correlated to distance in accordance with the relationship $W_i(x)=X-X_i$;

summing means for combining said weighted PME signal values to produce a composite PME signal; and correlator means for correlating said plurality of weighting values to distance values whereby a distance value of the scintillation event is selected when said composite PME signal assumes a predetermined value.

9. The system of claim 8 wherein said summing means comprises a summing network.

10. The system of claim 8 wherein there are further provided:

memory means for storing a plurality of said weighting values;

maximum input selector means for determining which of said PMEs provided at its output a PME signal having a largest PME signal value;

first ROM means for providing a search start address of said memory means; and second ROM means for providing a search stop address of said memory means, said first and second ROM means being responsive to said maximum input selector means.

11. The system of claim 10 wherein said maximum input selector means comprises:

summing means for producing a sum signal corresponding to a summation of said PME signals in each of a plurality of axes of said predetermined configuration of said PMEs; and comparator means for selecting one of said axes as corresponding to a portion of a coordinate pair identifying the location of said one of said PMEs having at its output said PME signal having said largest PME signal value.

* * * * *

UNITED STATES PATENT AND TRADEMARK OFFICE
CERTIFICATE OF CORRECTION

PATENT NO. : 4,959,809

DATED : September 25, 1990

INVENTOR(S) : W. Leslie Rogers, et al.

It is certified that error appears in the above-identified patent and that said Letters Patent is hereby corrected as shown below:

Column 1, between the title and the heading "Background of the Invention", please insert the following paragraph:
-- Government Rights

This invention was made with Government support under Grant No. 2R01 CA32846 awarded by the National Cancer Institute of the National Institutes of Health. The Government has certain rights in the invention. --;

Col. 2, line 23, change "it" to -- It --;

Col. 2, line 37, after "still" delete -- a --;

Col. 5, line 6, change "M." to -- M, --;

Col. 5, line 40, change "form" to -- from --; and

Col. 10, line 10, delete "4".

Signed and Sealed this

Twenty-seventh Day of October, 1992

Attest:

DOUGLAS B. COMER

*Attesting Officer*    *Acting Commissioner of Patents and Trademarks*